(12) United States Patent
Eilken et al.

(10) Patent No.: US 9,279,439 B2
(45) Date of Patent: Mar. 8, 2016

(54) ATTACHMENT ARRANGEMENT, A CONNECTING DEVICE, AND ALSO A METHOD

(71) Applicant: Airbus Operations GmbH, Hamburg (DE)

(72) Inventors: Wolfgang Eilken, Hamburg (DE); Memis Tiryaki, Hamburg (DE); Daniel Sauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 498 days.

(21) Appl. No.: 13/662,655

(22) Filed: Oct. 29, 2012

(65) Prior Publication Data

US 2013/0139374 A1 Jun. 6, 2013

Related U.S. Application Data

(60) Provisional application No. 61/552,477, filed on Oct. 28, 2011.

(30) Foreign Application Priority Data

Oct. 28, 2011 (DE) .......................... 10 2011 085 450

(51) Int. Cl.
*F16B 7/00* (2006.01)
*H02G 3/30* (2006.01)
*F16B 5/06* (2006.01)
*F16B 21/09* (2006.01)

(52) U.S. Cl.
CPC ................. *F16B 7/00* (2013.01); *F16B 5/0628* (2013.01); *F16B 21/09* (2013.01); *H02G 3/30* (2013.01); *Y10T 29/49947* (2015.01); *Y10T 403/32008* (2015.01)

(58) Field of Classification Search
CPC .......... F16B 7/00; F16B 5/0628; F16B 21/09; H02G 3/30; Y10T 29/49947; Y10T 403/32008
See application file for complete search history.

(56) References Cited

U.S. PATENT DOCUMENTS 3,279,518 A * 10/1966 Bollinger ...................... 411/166
6,642,453 B2 * 11/2003 Shotey et al. ................... 174/66

FOREIGN PATENT DOCUMENTS

DE 101 34 887.8 2/2003
DE 10 2005 030 165 5/2006

(Continued)

OTHER PUBLICATIONS

German Search Report, Oct. 12, 2012.

*Primary Examiner* — John C Hong
(74) *Attorney, Agent, or Firm* — Greer, Burns & Crain, Ltd.

(57) ABSTRACT

An attachment arrangement for attaching a component to a base item, with at least one fixing device for fixing one section of the component on a section of the base item. At least one connecting device with a connecting element and at least one receiving element are provided. One of the elements is arranged on a component section and the other of the elements is arranged on a base item section. The two elements detachably engage with one another in a form fit. Loads can be transferred at least in the direction of a first axis, and a relative movement is possible between the elements in the direction of a second axis, different from the first axis. A connecting device is disclosed for such an attachment arrangement. A method is disclosed for purposes of attaching a component to a base item by means of such an attachment arrangement.

13 Claims, 15 Drawing Sheets

(56) References Cited

FOREIGN PATENT DOCUMENTS

| | | |
|---|---|---|
| DE | 102006053966 | 5/2008 |
| DE | 102007032233 | 1/2009 |
| DE | 102009015858 | 10/2010 |
| DE | 102009022175 | 12/2010 |

* cited by examiner

ATTACHMENT ARRANGEMENT, A CONNECTING DEVICE, AND ALSO A METHOD

BACKGROUND OF THE INVENTION

The invention concerns an attachment arrangement for purposes of attaching a component to a base item, a connecting device for such an attachment arrangement, and also a method for purposes of attaching a component to a base item.

Components in aircraft, such as cabin components, power, signal, or data cables, structural elements, and similar, are regularly fixed in location in the x, y, and z directions to a base item, e.g., to an aircraft structure. The type of fixing is thereby matched to the type of component. Thus, for example, cables, or cable harnesses, are often directly attached to their respective structural sections by means of cable binders. As shown in DE 10 2006 053 966 A1 and also in DE 10 2009 022 175 A1, the cable harnesses can however also be attached to the structural sections in combination with so-called "snap and click" connectors. Components such as transverse beams are regularly riveted to frames, as shown in DE 10 2009 015 858 A1. To increase flexibility with regard to cable runs and in particular to increase flexibility with regard to the attachment of cabin elements such as overhead lockers, DE 10 2007 032 233 A1 proposes a secondary structure in the form of a framework, which is composed of longitudinal and transverse rails, and is attached to the primary structure. The attachment arrangements as described are however technically complex to install, in particular if the attachment must be made to structural sections that are difficult to access. Moreover the attachment arrangements do not enable any compensation for distortions, as a consequence of varying in-flight loads, for example, so that constraint forces are regularly introduced into the components, and moreover the attachments are severely loaded.

SUMMARY OF THE INVENTION

The object of the present invention is to create an attachment arrangement for purposes of attaching a component to a base item, which removes the above-cited disadvantages, and in particular enables a simple installation and the avoidance of constraint forces. Furthermore it is the object of the invention to create a connecting device for such an attachment arrangement, and also a simple installation method that accommodates tolerances for the attachment of a component to a base item.

An inventive attachment arrangement for purposes of attaching a component to a base item has at least one fixing device for purposes of fixing the location of one section of the component on a section of the base item, and at least one connecting device, which has a connecting element and a receiving element, of which the one element can be arranged on a component section and the other element can be arranged on a base item section, and which in the installed state, i.e., the attached state, detachably engage with one another in a form fit, wherein loads can be transferred at least in the direction of a primary axis, and relative movements are possible between the elements in the direction of a movement axis.

The inventive attachment arrangement enables a simple installation of the component on a base item, since the form-fit connecting device can be deployed at least in the region of base item sections that are difficult to access. The connecting device, i.e., the connecting element and the receiving element, can easily be pre-installed, so that the actual installation, i.e., the final installation of the connecting device comprises, for example, of just a sliding movement or an inserting movement. Moreover, by virtue of the relative movements between the elements in the direction of the movement axis, the inventive attachment arrangement allows for displacements in the positions of the component and the base item relative to one another in defined sections, so that any constraint forces as a consequence of distortions and similar are effectively prevented. The at least one fixing device operates, so to speak, as a fixed bearing and the at least one connecting device operates, so to speak, as a floating bearing with at least one degree of freedom. Thus, in the event of a multiplicity of connecting devices, depending upon the positioning and the number of connecting devices in certain component sections, distortions can be locally allowed in at least one axis direction relative to the base item. However, in the direction of the primary axis any relative movements are blocked, so that the loads can be transferred without any play.

In one example of an embodiment, for purposes of enabling further relative distortions between the component and the base item, movements of the elements relative to one another are possible in the direction of a secondary axis.

In an alternative example of an embodiment movements of the elements relative to one another in the direction of the secondary axis are blocked, so that loads can be transferred in the direction of the secondary axis.

For purposes of providing a self-locking action between the component and the base item, in particular for the purpose of transferring small loads in the direction of the movement axis while enabling a limited relative movement, a latching action can be provided between the connecting element and the receiving element, which when subjected to an opening force as a consequence of stresses arising in the component and in the base item, opens automatically beyond a certain level of loading.

A reliable self-locking action, e.g., a latching action, which can be simply manufactured under production conditions, and is low maintenance and reliable, can be achieved, for example, if the connecting device for purposes of forming the latching action has at least one spring tongue with a latching section and a latching section receptor. A plurality of spring tongues, in particular two, are preferably provided, in each case with one latching section, and an equal number of latching section receptors.

In a preferred example of an embodiment the connecting element has a shank that is tapered relative to a head section; in the installed state this extends in the direction of the secondary axis, and the receiving element has an elongated hole to receive the shank; in the installed state this extends in the direction of the movement axis. The shank, in combination with the elongated hole, enables the transfer of large loads in the direction of the primary axis. Moreover the elongated hole basically enables relative movements in the direction of the movement axis; these can be limited on one side by means of an elongated hole wall, and on both sides in combination with the latching action. By virtue of the tapering of the shank the head section is of a widened design and forms a limit in the direction of the secondary axis, which, depending upon a selected length-depth relationship of the shank to the elongated hole, can be subject to tolerances, or free of tolerances.

To reduce a contact pressure in the direction of the primary axis it is advantageous if the shank has opposed flattened contact surfaces, and the elongated hole has two facing seating surfaces, for purposes of providing seating for the contact surfaces. In the case of a cylindrical shank, "flattened" means, for example, a radius reduction compared with adjacent shank surfaces, culminating in planar contact surfaces.

For purposes of introducing the connecting element into the elongated hole it is advantageous if the head section is tapered in the direction of introduction.

To simplify an orientation of the connecting element relative to the receiving element, i.e., to the elongated hole, a receptor can be designed in the head section so as to interact with an anti-rotation element. For example, the receptor can be an end face groove, and the anti-rotation element can be a screwdriver engaging in the end face groove.

So as to be able to replace a damaged connecting element installed on the component, or on the base item, with a new connecting element easily, for example, it is advantageous if the connecting element can be secured to the component, or to the base item, by means of a screwed connection. The screwed connection can, for example, be made by means of a direct screwed engagement between the connecting element and the component, or the base item, or, for example, by the use of a threaded element such as a nut that can be screwed onto the connecting element.

For purposes of easing the installation further, in particular for purposes of reducing the number of parts, the receiving element can be embodied integrally with the component, or with the base item.

In one preferred example of an embodiment the fixing device is a connecting device, which transfers loads in the directions of all axes, i.e., blocks any relative movement in the directions of all axes. Alternatively the fixing device is, for example, a conventional riveted joint or pinned joint.

A preferred connecting device for an inventive attachment arrangement has a connecting element and a receiving element, of which the one element can be arranged on a component section and the other element can be arranged on a base item section, and which in the installed state detachably engage with one another in a form fit, wherein loads can be transferred at least in the direction of a primary axis, and relative movements are possible between the elements in the direction of a movement axis. Such a connecting device enables force-fitted or materially-bonded connections, such as a riveted joint, a pinned joint or an adhesively bonded joint, to be dispensed with, and by this means significantly simplifies the installation.

In a preferred method for attaching a component to a base item using an inventive attachment arrangement, a primary axis and a movement axis are firstly defined. The at least one connecting device is then pre-installed on the component and the base item, aligned with the primary axis and the movement axis. The component is then installed on the base item and is then fixed in location by means of at least one fixing device on a section on the base item. Such a method enables the installation time to be reduced since the connecting device is pre-installed and thus reduces the final installation by a corresponding number of installation steps. Moreover in the region of a section of the component or base item that is difficult to access, an attachment can be undertaken by means of the connecting device. In addition the number of interdependent tolerances on the fixing devices is reduced.

BRIEF DESCRIPTION OF THE DRAWINGS

In what follows, preferred examples of embodiments of the invention are elucidated in more detail with the aid of schematic representations. Here.

DETAILED DESCRIPTION OF THE PREFERRED EMBODIMENTS

Figure 1:
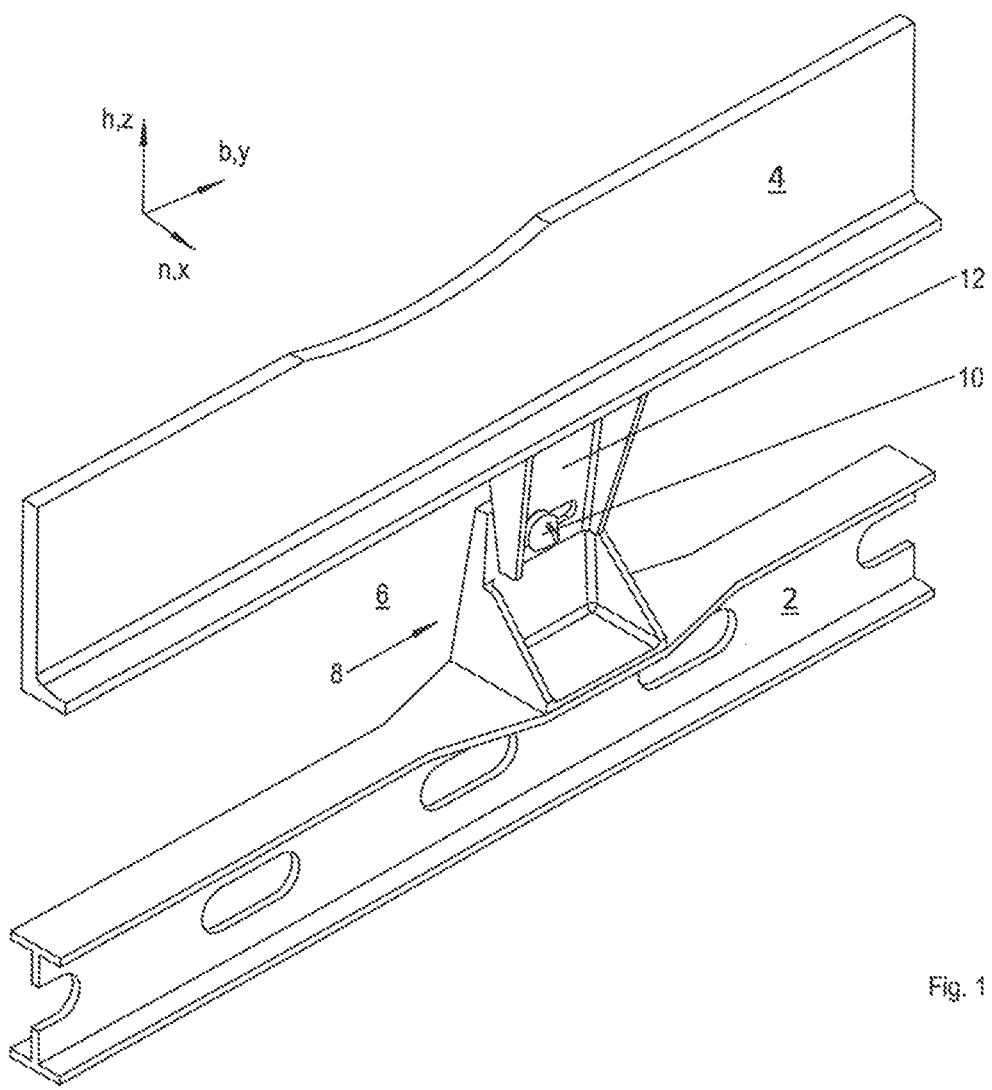
FIG. 1 shows an attachment of a component to a base item with an inventive attachment arrangement.

FIG. 1 shows in a scrap section the attachment of a component 2 to a base item 4 by means of an inventive attachment arrangement 6. The component 2 is, for example, a secondary support structure of an aircraft for purposes of accommodating installation lines, cabin systems and similar. The base item 4 is, for example, a primary structure of the aircraft, such as a transverse floor beam.

The attachment arrangement 6 has at least one fixing device, not shown, and at least one connecting device 8. The fixing device serves to fix the location of a region of the component 2 on a region of the base item 4 in all axis directions. In the example of embodiment shown in FIG. 1 the connecting device 8 serves the purpose of transferring primary loads in the direction of a primary axis h without any play. Secondary loads can be transferred between the component 2 and the base item 4 in the direction of a secondary axis n that runs transverse to the primary axis h, wherein, depending upon the design of the connecting device 8, these load transfers can be preceded by relative movements within selected tolerance limits between the component 2 and the base item 4 in the region of the connecting device 8 in the direction of the secondary axis n. In the region of the connecting device 8 relative movements 4 between the component 2 and base item are possible in the direction of a movement axis b that runs orthogonally with respect to the primary axis h and to the secondary axis n. In the example of embodiment shown, the primary axis h runs in the vertical direction z of the aircraft, the secondary axis n runs in the longitudinal direction x of the aircraft, and the movement axis b runs in the transverse direction y of the aircraft. However, if the primary load runs at another angle, the angle of installation can be altered appropriately so as to match this to the load direction.

In accordance with FIG. 1 the connecting device 8 has a connecting element 10 and also a receiving element 12. The connecting element 10 and the receiving element 12 are in each case attached to a flanged section of the parts 2, 4, or are designed integrally with them.

Figure 2:
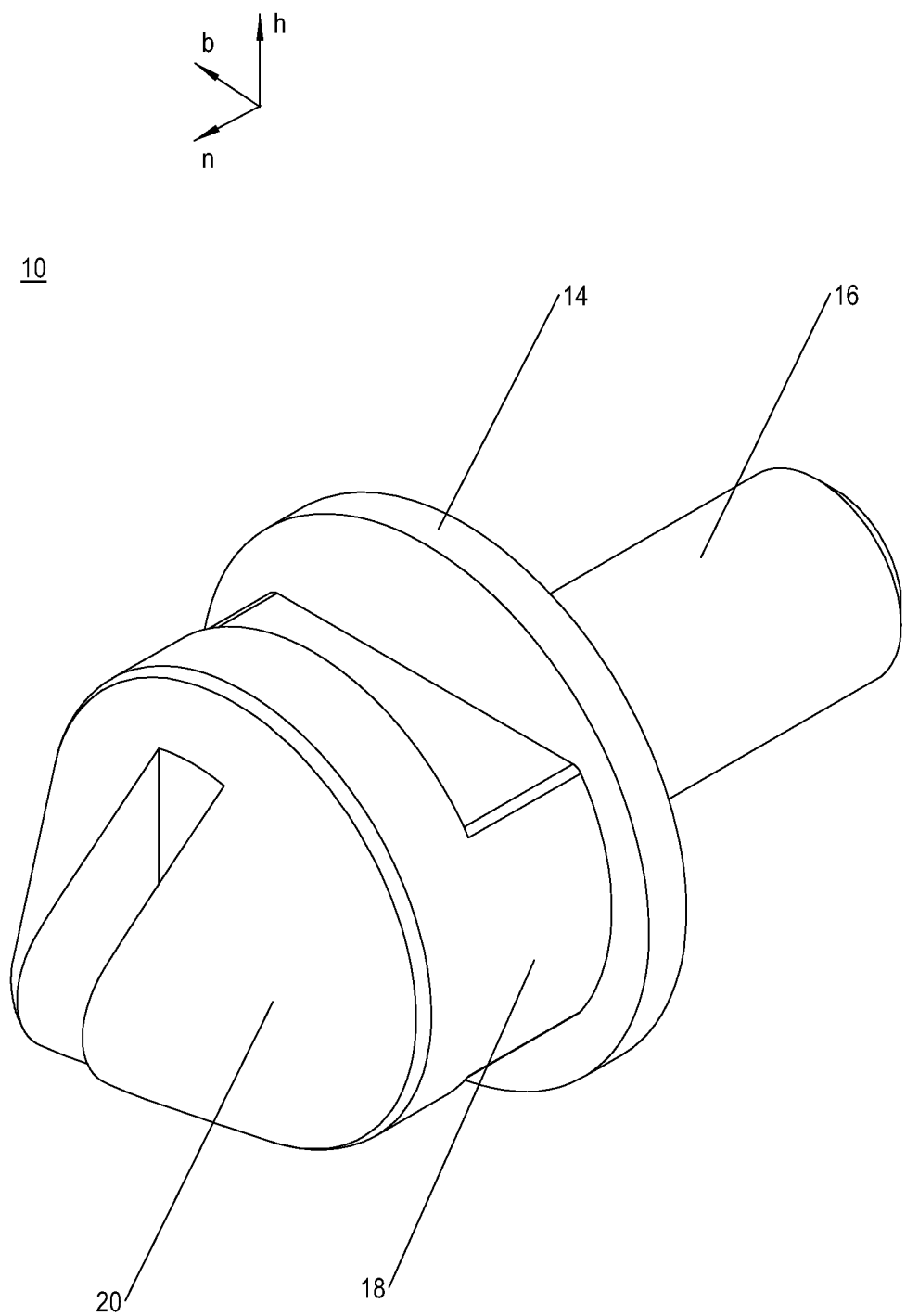
FIG. 2 shows a connecting element of a first example of embodiment of a connecting device of the attachment arrangement.

The connecting element 10 is designed in the form of a bolt or a pin. In a first example of an embodiment of the connecting device 8 the connecting element 10 has, in accordance with FIG. 2, a collar 14, a threaded section 16 extending from the rear face of the collar, and also a connecting section extending from the front face of the collar, which connecting section is formed from a shank 18 and a head section 20.

Figure 3:
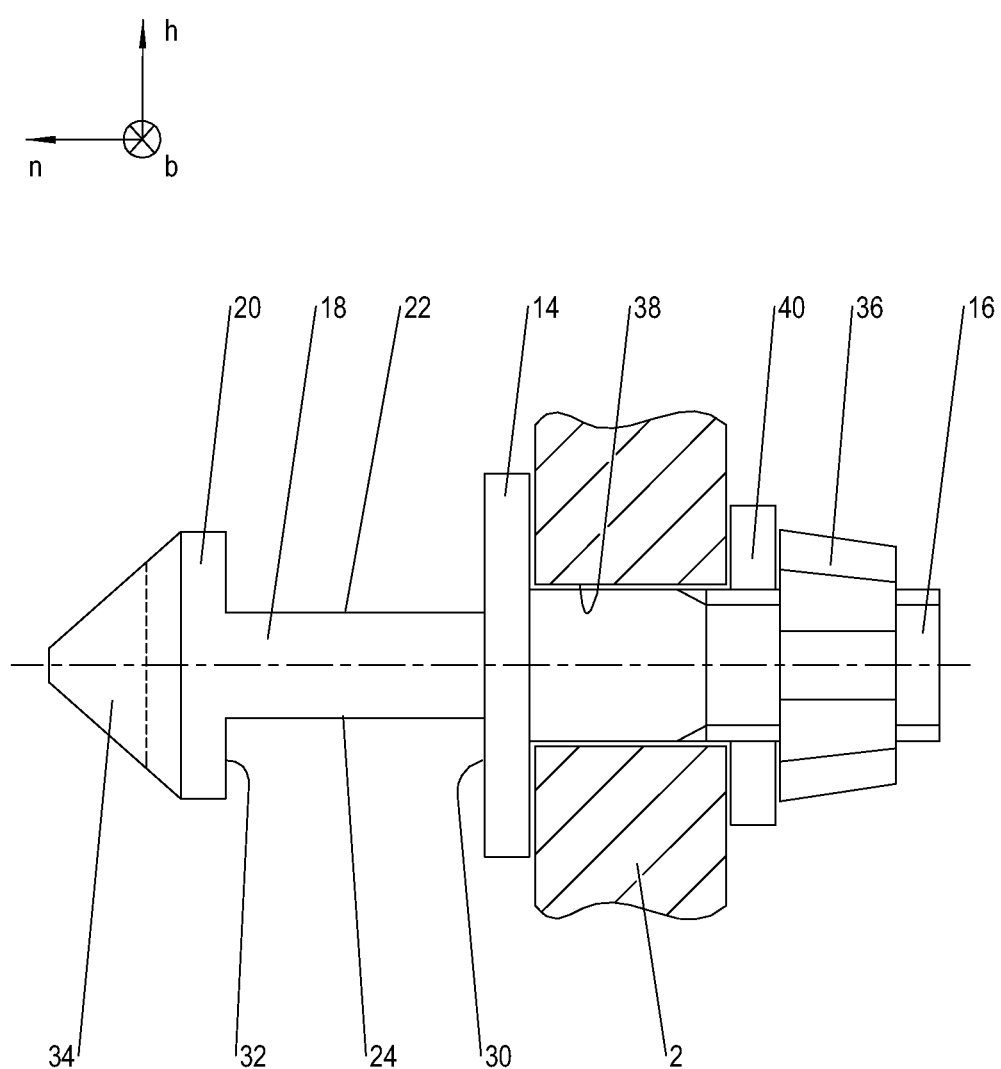
FIG. 3 shows a side view of the connecting element.

In accordance with the presentation in FIG. 3, the shank 18 is flattened on opposing sides running transverse to the primary load direction (primary axis h) so as to create two plane contact surfaces 22, 24. The contact surfaces 22, 24 interact in each case with a seating surface 26, 28 of the receiving element 12, shown in FIG. 4, and effect a reduction of the contact pressure when the primary load is transferred. In the direction of the secondary axis n the shank 18 is bounded by a collar surface 30 in the form of a ring, and also by a facing annular surface 32 of the head section 20.

The head section 20 is of a conically tapered design in the direction of introduction, and has an end face groove 34 for purposes of introducing, for example, a screwdriver or similar tool, for purposes of preventing any rotation of the connecting element 10 as it is being pre-installed on the component 2.

The connecting element 10 is fixed to the component 2 by means of a nut 36, which is screwed onto the threaded section 16 guided through a hole 38. The nut 36 is preferably self-locking. Amongst other features for purposes of protecting the component a washer 40 is arranged between the component 2 and the nut 36.

Figure 4:
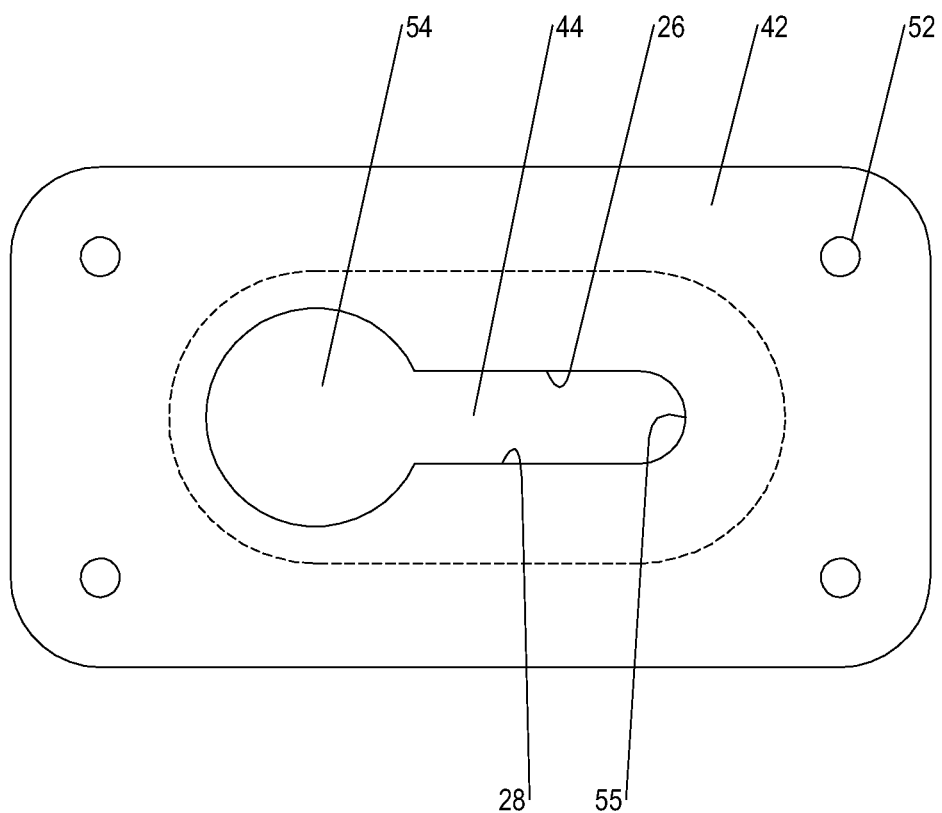
FIG. 4 shows a perspective view of a receiving element of the attachment arrangement.
Figure 5:
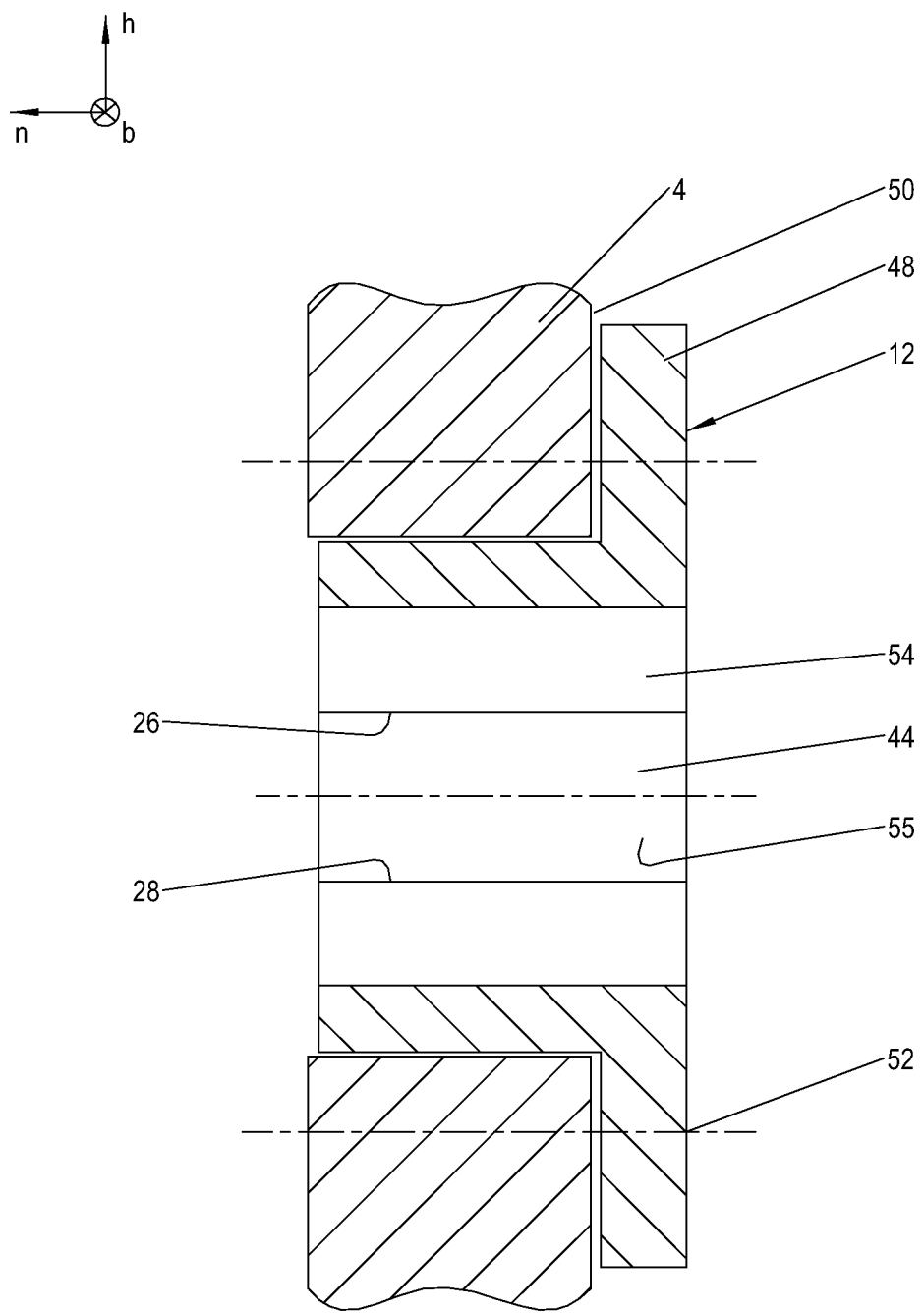
FIG. 5 shows another perspective view of a receiving element of the attachment arrangement.

In accordance with FIG. 4 the receiving element 12, in a variant that is manufactured separately from the base item 4, has a base 42 that is to be arranged on the base item 4, into which an elongated hole 44 is introduced, extending in the longitudinal direction of the base 42. However, the base 42 can also represent an integral section of the base item 4 (see FIG. 1). However, it is always orientated on the base item 4 such that the seating surfaces 26, 28, which act both as force transfer surfaces in the direction of the vertical axis h and also as guidance surfaces in the direction of the movement axis b, run transverse to the vertical axis h, i.e., such that the elongated hole 44 runs in the direction of the movement axis b. As presented in FIG. 5, the base 42, for purposes of defining an installation position of the receiving element 12 on the base item 4 in the direction of the secondary axis n, has a collar section 48 that is to be seated on a base item surface 50. The fixing of the receiving element 12 to the base item 4 is preferably undertaken by means of a riveted joint or a pinned joint, for which purpose the receiving element 12 and the base item 4 have corresponding rivet holes 52.

Figure 6:
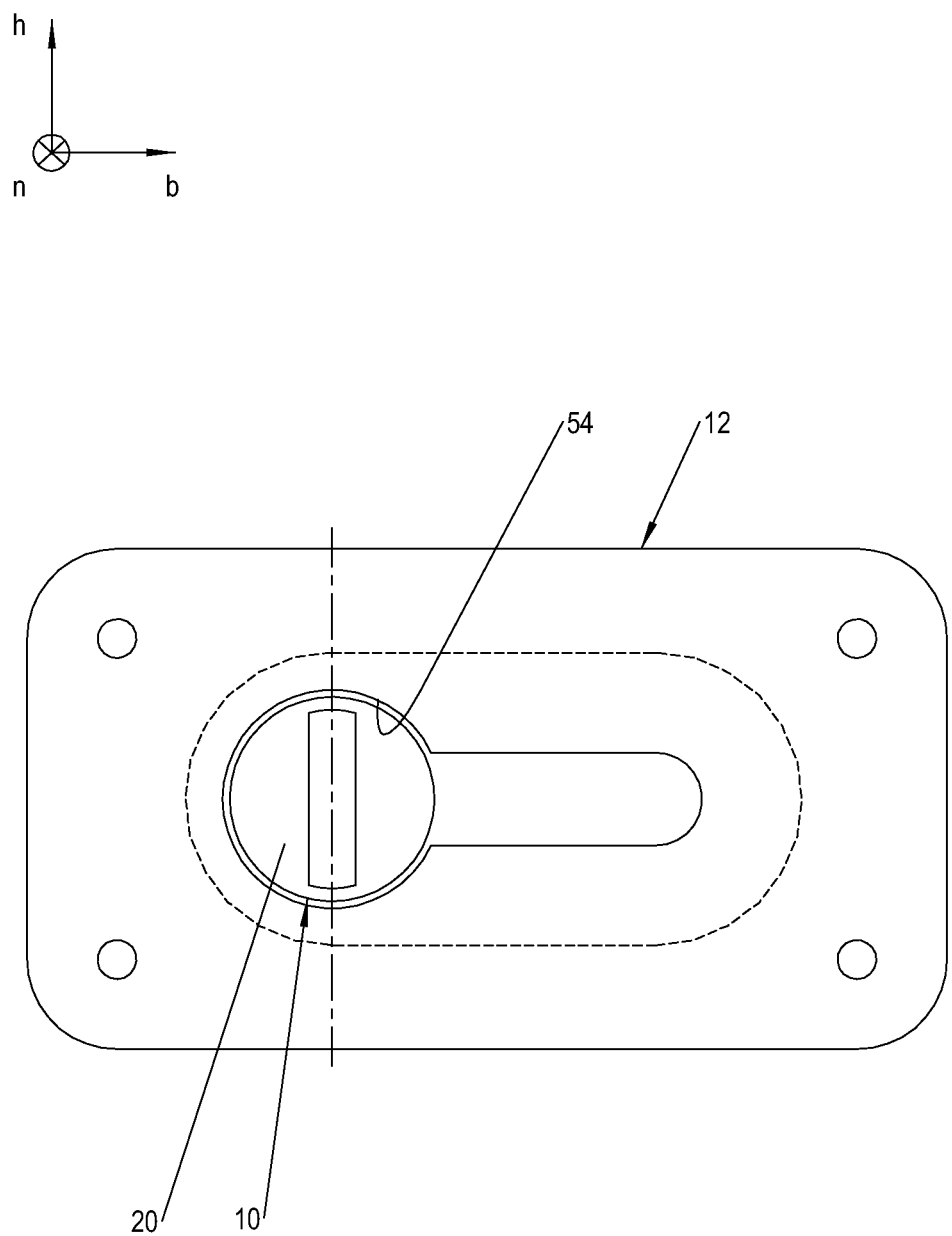
FIG. 6 shows a representation for purposes of clarifying the dimensional relationships between the connecting element and the receiving element.
Figure 7:
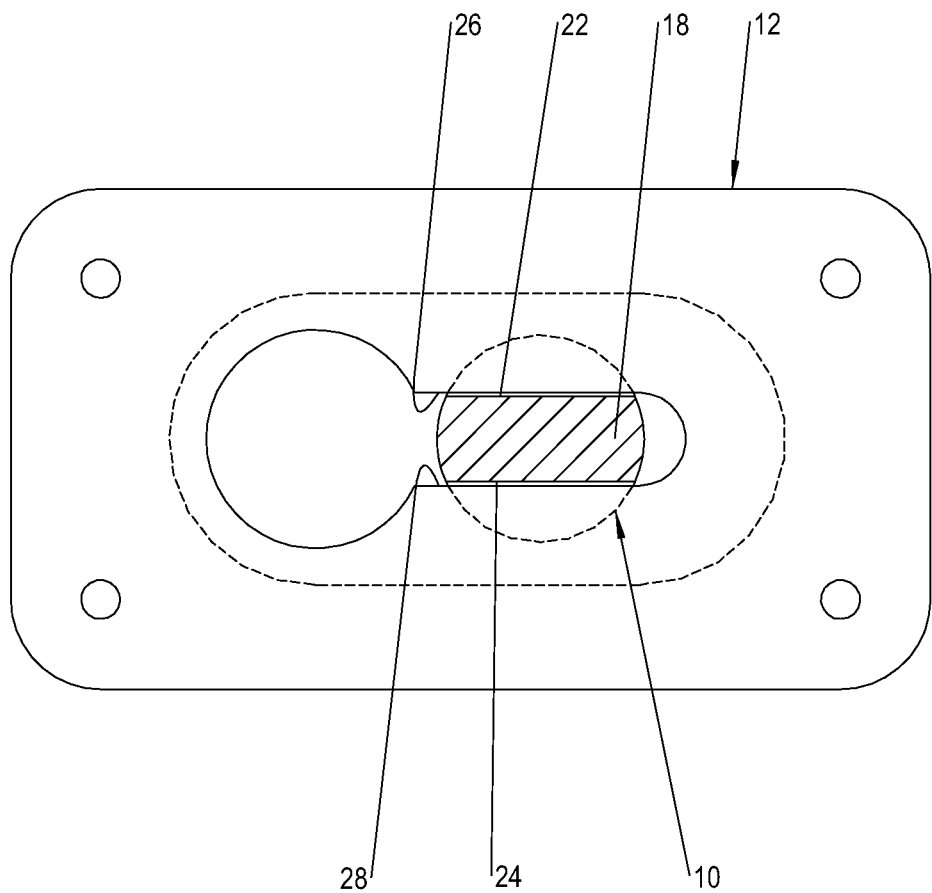
FIG. 7 shows another representation for purposes of clarifying the dimensional relationships between the connecting element and the receiving element.

As shown in FIG. 4, the elongated hole 44 has a region of introduction 54 and a guidance region, which is formed by the facing seating surfaces 26, 28, which run parallel to one another. As shown in FIG. 6, the region of introduction 54 has an internal diameter that is somewhat larger than a maximum external diameter of the head section 20 of the connecting element 10. As shown in FIG. 7, the distance between the seating surfaces 26, 28 in the direction of the primary axis h is the distance between the contact surfaces 22, 24 of the shank 18. A tolerance in the direction of the primary axis h can be set as a function of the distance between the seating surfaces 26, 28 and the distance between the contact surfaces 22, 24, relative to one another. However, in the direction of the primary axis h a fit is preferably selected that enables the transfer of loads without any play. However, despite the transfer of loads without any play in the direction of the primary axis h, in order to enable a movement of the connecting element 10 relative to the receiving element 12 without any clamping action, press fits are avoided.

The extent of the shank 18, and that of the elongated hole 44 in the direction of the secondary axis n, i.e., the axial length of the shank 18 and the depth of the elongated hole 44, are selected such that minimal relative movements are possible in the direction of the secondary axis n, and thus a transfer of secondary loads is achieved with some play. Alternatively, however, the length-depth relationship can also be selected such that, in an analogous manner to the transfer of the primary load, a transfer of load in the direction of the secondary axis n is undertaken without any play.

The extent of the elongated hole 44 in the direction of the movement axis b, and thus its length, is selected such that, in the case of a calculated maximum relative distortion between the component 2 and the base item 4 in the region of the connecting device 8, the shank 18 is always at some distance from the region of introduction 54 and from a wall 55 of the elongated hole 44, which in the installed state extends essentially in the direction of the primary axis h (see FIG. 7).

In a second example of an embodiment of a connecting device 8 of the attachment arrangement 6, described in more detail in FIGS. 8 to 12, the connecting device 8 features a detachable self-locking action, e.g., a latching action, in the direction of the movement axis b. The self-locking action forms a limit to movement in the direction of the region of introduction 54. In combination with the hole wall 55 it forms a range of movement in the direction of the movement axis b, over which relative distortions are possible without any resistance. However, in contrast to the hole wall 55, the self-locking action preferably does not form a rigid limit, but instead automatically opens up the range of movement when subjected to a set opening force, generated as a result of in-flight loads, for example, so that relative distortions beyond the range of movement are also possible. In one variant, however, the self-locking action is only to be opened up manually by means of an appropriate tool.

Figure 8:
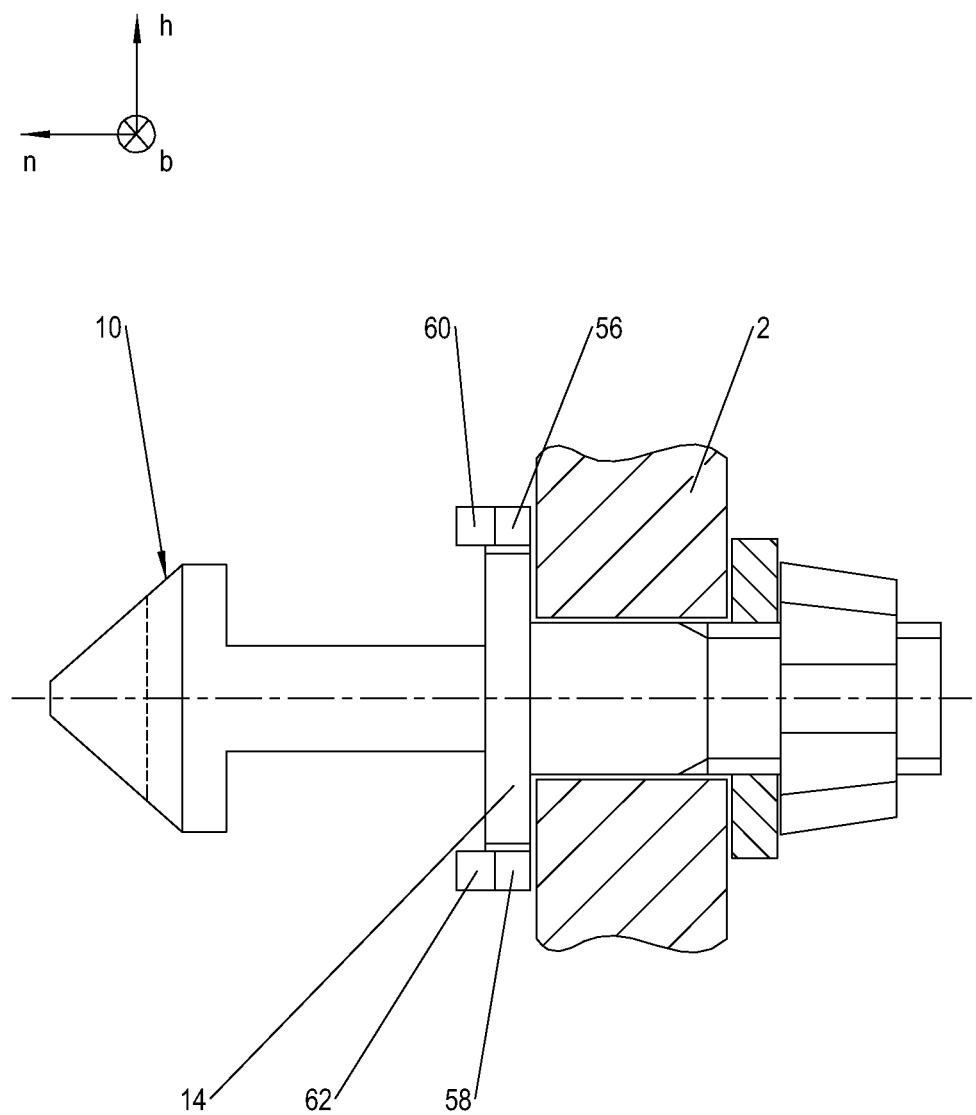
FIG. 8 shows a connecting element of a second example of embodiment of a connecting device of the attachment arrangement.
Figure 9:
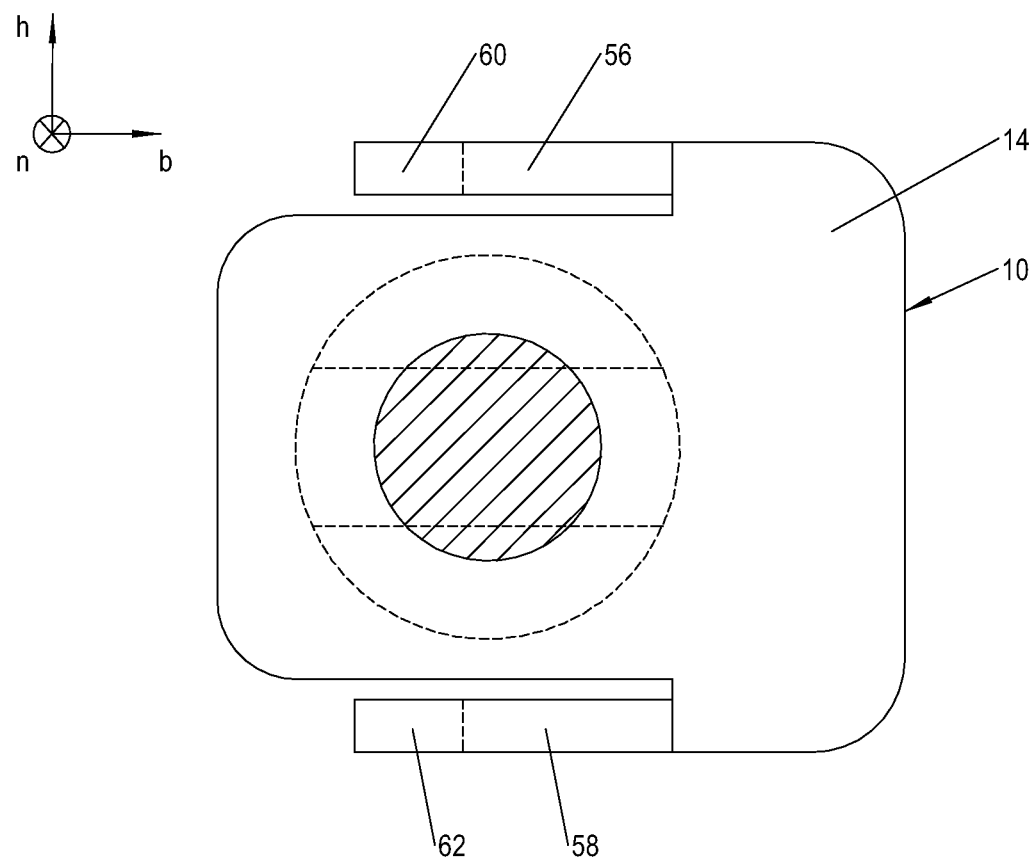
FIG. 9 shows a detail from FIG. 8.
Figure 10:
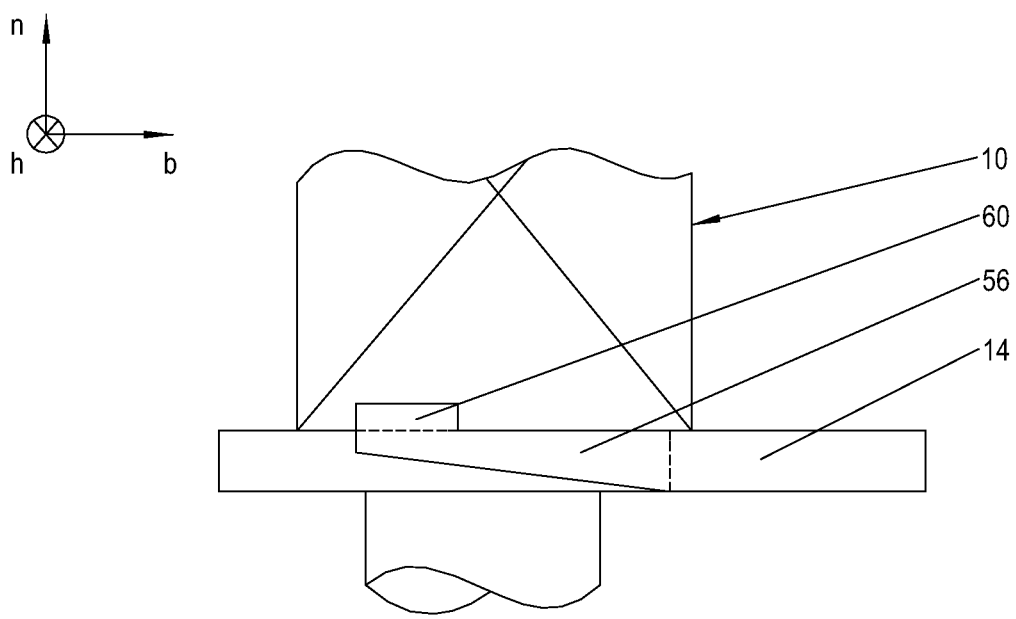
FIG. 10 shows a detail from FIG. 8.

For purposes of forming the self-locking action the connecting element 10 has, in accordance with FIGS. 8, 9 and 10, on its collar 14 two spring tongues 56, 58 that are spaced apart from one another in the direction of the primary axis h, and which extend in the direction of the movement axis b; each is provided on its end with a latching tab 60, 62.

Figure 11:
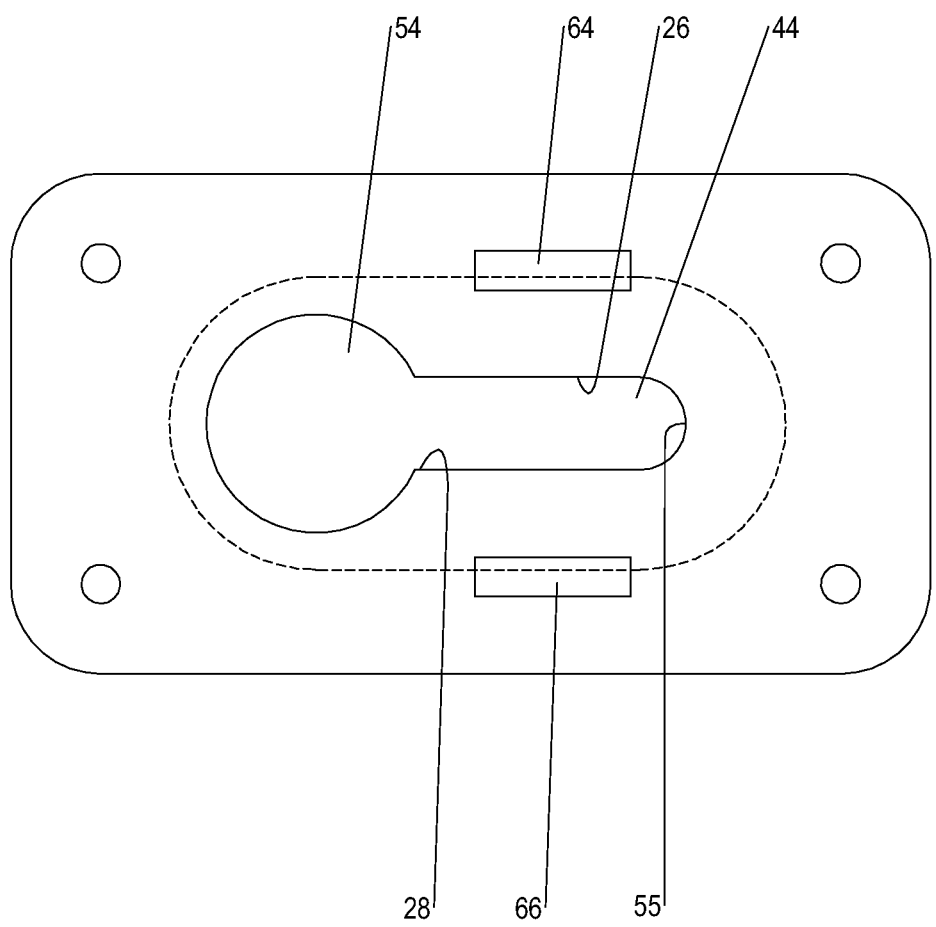
FIG. 11 shows a receiving element in accordance with the second example of embodiment of the connecting device.
Figure 12:
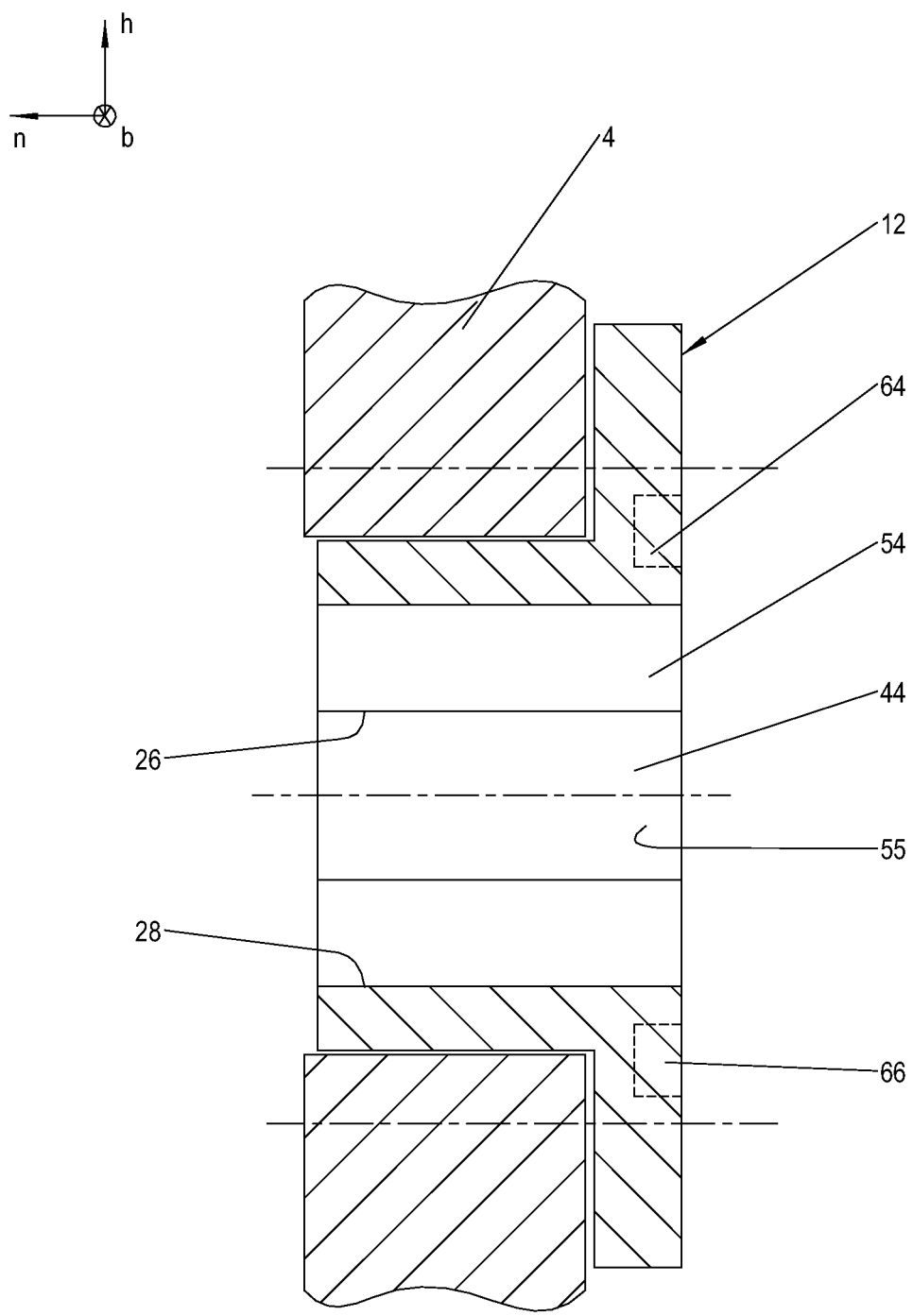
FIG. 12 shows another receiving element in accordance with the second example of embodiment of the connecting device.

In accordance with FIGS. 11 and 12, the receiving element 12 has two latching grooves 64, 66 to receive the latching tabs 60, 62; at the side of the seating surfaces 26, 28 these extend in the direction of the movement axis b, and thus in the longitudinal direction of the elongated hole 44.

In what follows two preferred methods are presented, with the aid of FIGS. 13 to 18, for the purpose of attaching the component 2 to the base item 4 by means of the inventive attachment device 6.

The direction of the primary load, and thus the direction of the primary axis h, is firstly defined. The direction is then defined, in which sections of the component 2 and of the base item 4 are to be able to execute the greatest possible distortions relative to one another. In this manner the movement axis b is then defined.

After the definition of the primary axis h and the movement axis b the number of necessary connecting devices 8 and fixing devices is established.

A pre-installation of the connecting devices 8 is then undertaken. Here the connecting elements 10 and the receiving elements 12 are pre-installed, taking into account the primary axis h and the movement axis b on the component 2 and on the base item 4. The connecting elements 10 are aligned on the component 2 such that in the installed state of the component 2 on the base item 4 the shanks 18 are aligned in the direction of a secondary axis n, and the contact surfaces 22, 24 are orientated transverse to the direction of the primary axis h. For purposes of avoiding any rotation of the connecting elements 10 on the base item 4, screwdrivers can, for example, be introduced into the end face grooves 34. The receiving elements 12 are aligned with their elongated holes 44 on the base item 4 such that these extend in the direction of the movement axis b, wherein the seating surfaces 26, 28 are orientated transverse to the direction of the primary axis h. If, however, the receiving elements 12 are designed integrally with the base item 4, any pre-installation of these is eliminated.

Figure 13:
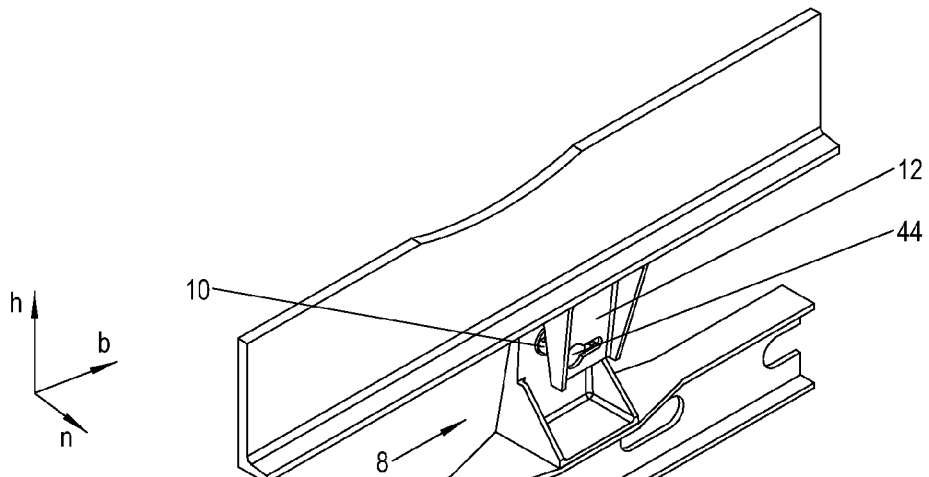
FIG. 13 shows steps in the installation of a component on a base item by means of the inventive attachment arrangement.
Figure 14:
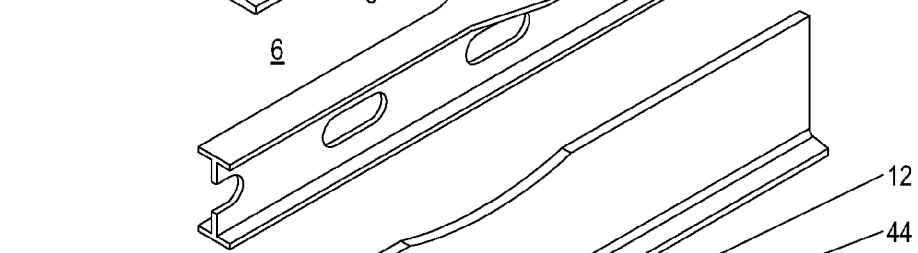
FIG. 14 shows additional steps in the installation of a component on a base item by means of the inventive attachment arrangement.
Figure 15:
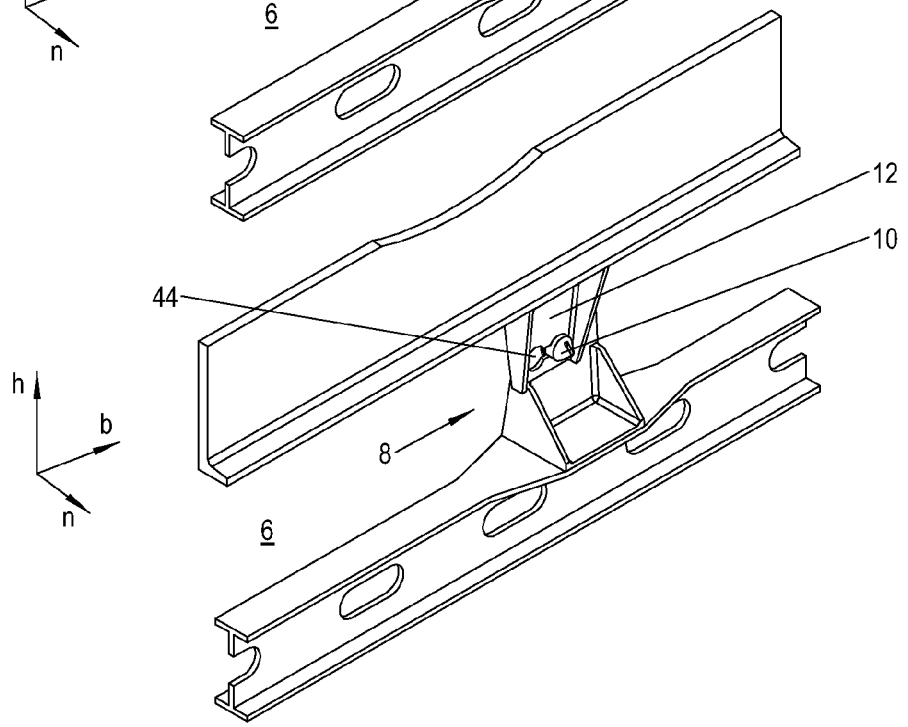
FIG. 15 shows additional steps in the installation of a component on a base item by means of the inventive attachment arrangement.

After the pre-installation there follows the final installation. To this end, as shown in FIGS. 13, 14 and 15, the connecting elements 10, together with their head sections 20, are introduced in the direction of the secondary axis n into the regions of introduction 54 of the elongated holes 44, and are then moved in the direction of the movement axis b. In the direction of the primary axis h the connecting elements 10, together with their contact surfaces 22, 24, abut against the seating surfaces 26, 28, and in the direction of the secondary axis n, together with their collar surfaces 30 and their annular surfaces 32 they abut against outer surfaces of the receiving elements 12 extending in the direction of the primary axis h, so that the connecting elements 10 are latched into the elongated holes 44. The component 2 is now attached to the base item 4 in the direction of the primary axis h without any tolerances. Likewise, depending upon the length-depth relationship of the shank 18 to the elongated hole 44, it is connected without any tolerances, or almost without any tolerances, to the base item 4 in the direction of the secondary axis n.

Figure 16:
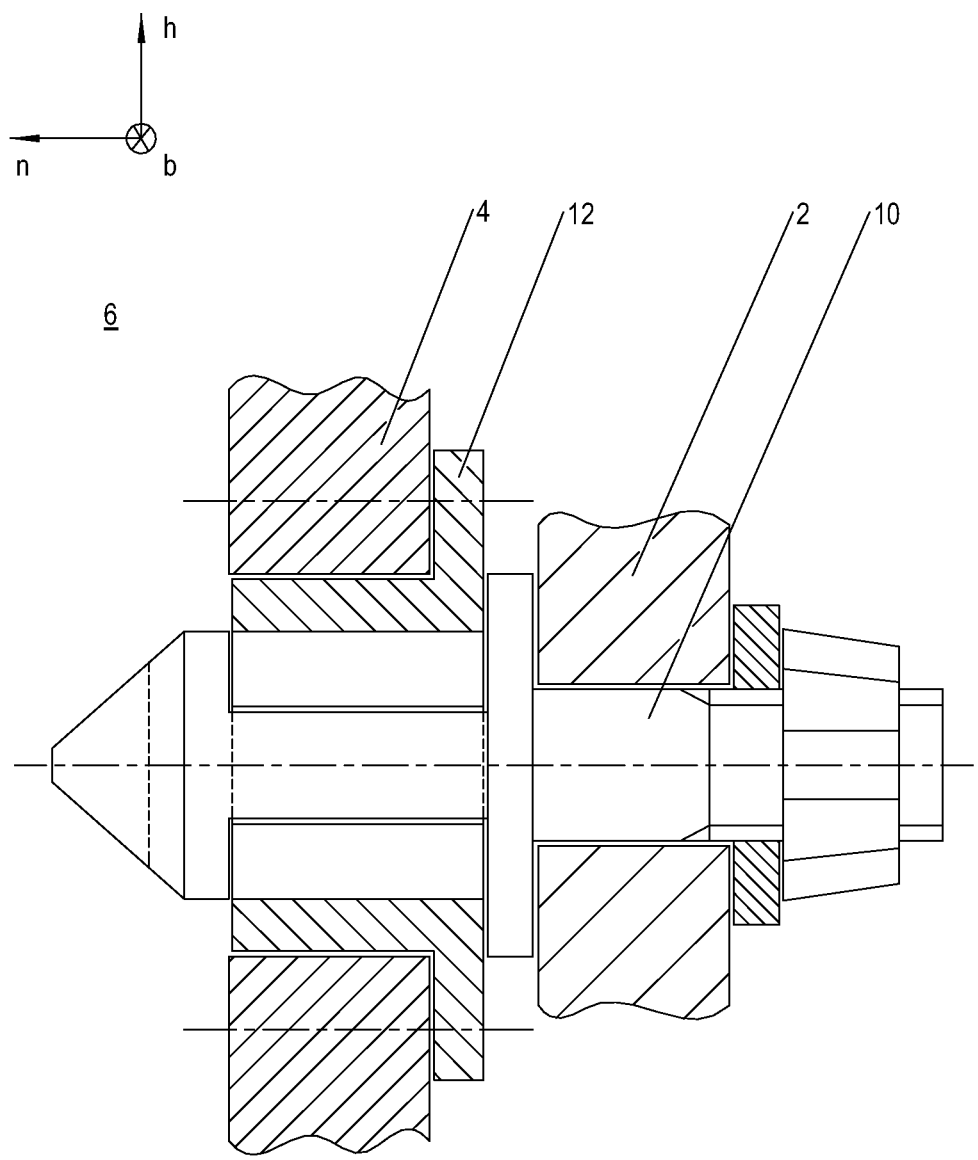
FIG. 16 shows a cross-sectional representation through the first connecting device in the installed state.

As shown in FIG. 16, when using the first example of an embodiment of the connecting device 8, relative movements without any resistance are possible between the component 2 and the base item 4 in the direction of the movement axis b, so that no forces can be transferred in the direction of the movement axis b. For purposes of fixing at least one section of the component 2 to the base item 4, in particular, for purposes of avoiding any automatic detachment, one section of the component 2 is fixed in its location by means of a fixing device at least in the direction of the movement axis b, preferably, however, in all axis directions, to a section of the base item 4. The fixing device is, for example, a riveted joint or a pinned joint. However, the fixing device can also be a connecting device 8 in accordance with the second example of an embodiment with a self-locking action in the direction of the movement axis b.

Figure 17:
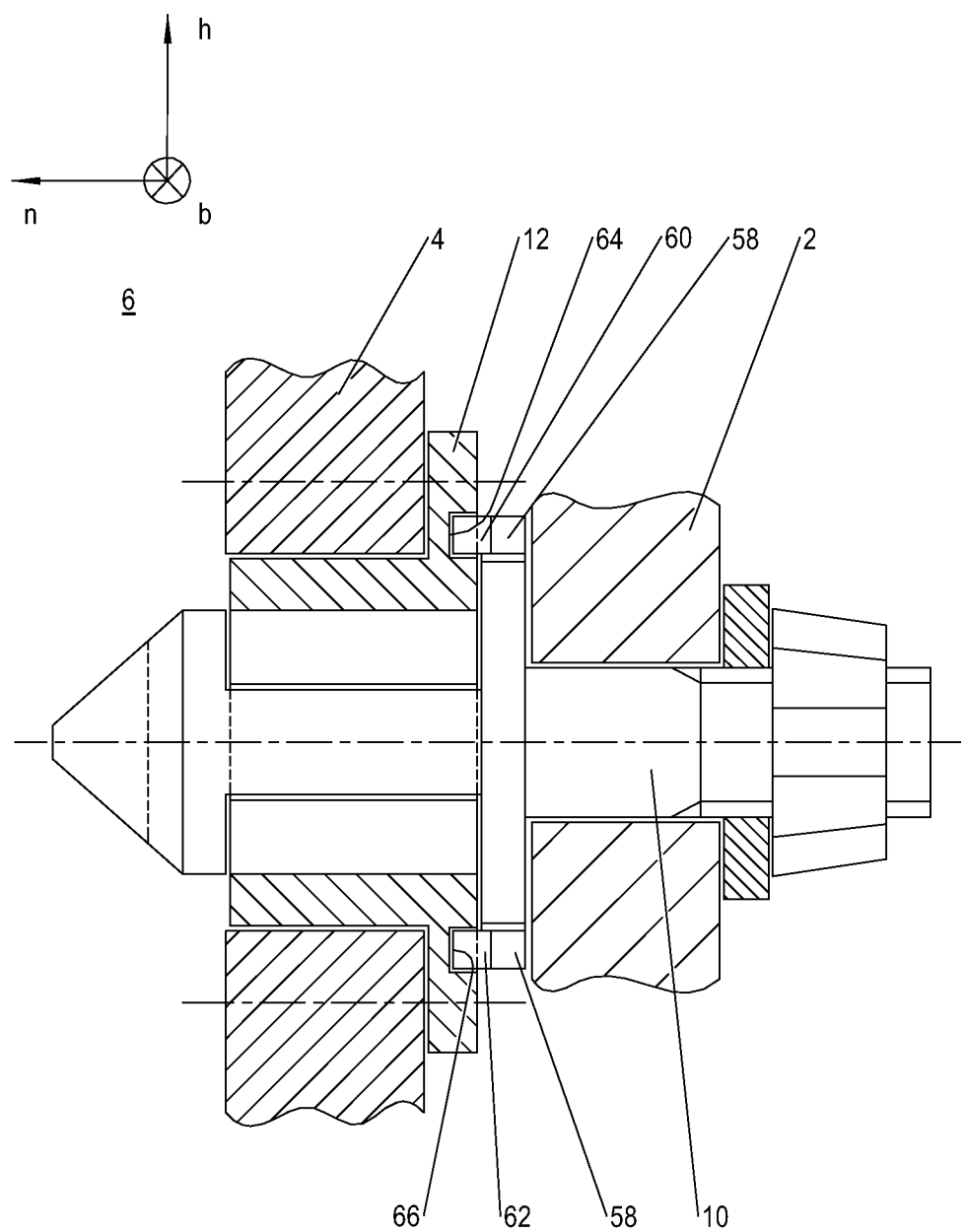
FIG. 17 shows a cross-sectional representation of the second connecting device in the installed state.
Figure 18:
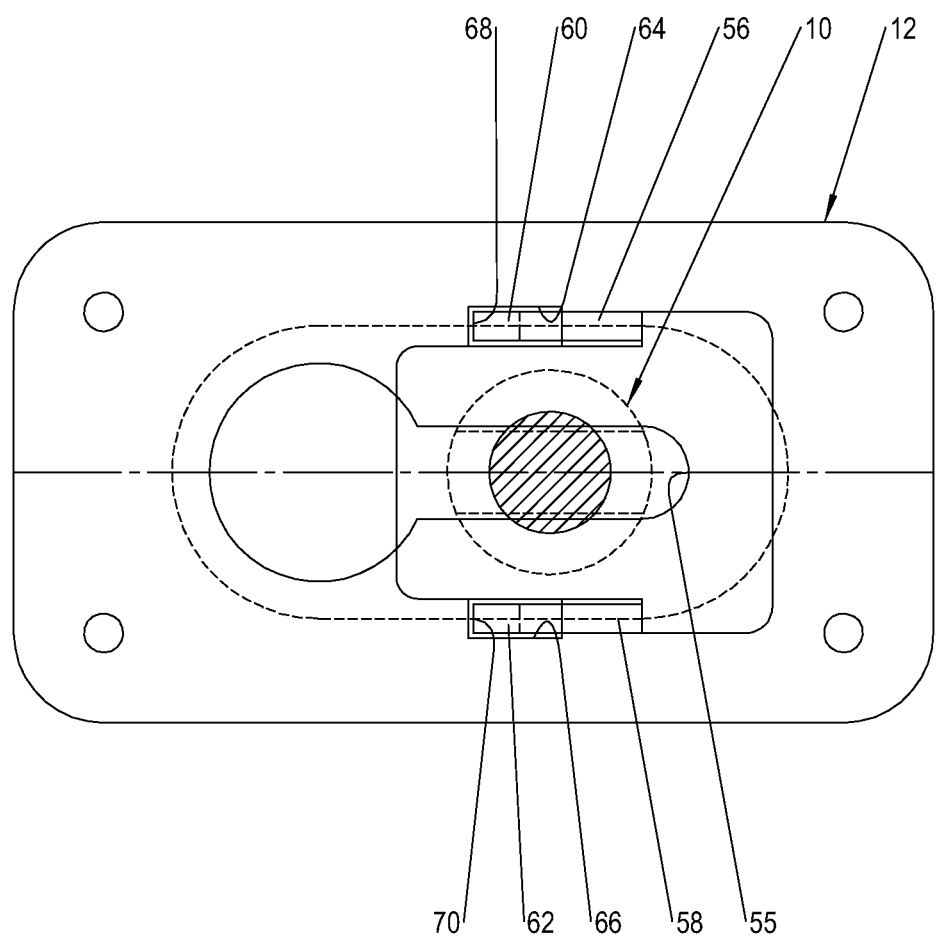
FIG. 18 shows another cross-sectional representation of the second connecting device in the installed state.

In accordance with FIGS. 17 and 18, when using the second example of an embodiment of the connecting device 8, a self-locking action of the connecting element 10 and the receiving element 12 takes place in the direction of the movement axis b, which allows a range of movement without any resistance. The range of movement is limited by the lateral collision of the shank 18 with the hole wall 55 and by the collision of the latching tabs 60, 62 with hole walls 68, 70 extending in the direction of the vertical axis z. Depending upon the shape of the latching tabs 60, 62 and the latching grooves 64, 66, and the spring actions of the spring tongues 56, 58, the self-locking action is designed such that, as already explained above, in the event of being subjected to an opening force it opens automatically without the use of a tool, or such that it can only be opened manually with a tool. Thus, contingent on a relative movement without any resistance, forces can be transferred at least in the direction of the movement axis b, and these are in fact forces that are smaller than the opening force. If the self-locking action is selected such that this can only be opened with a tool, the connecting device 8 forms, so to speak, a fixing device. If the self-locking action opens automatically without the use of a tool in the event of a defined deployment of force, at least one fixing device is required for purposes of fixing the location of the component 2 on the base item 4 in the direction of the movement axis b, in the form, for example, of a pinned joint or a riveted joint, in order to prevent any automatic detachment of the component 2 from the base item 4.

Disclosed is an attachment arrangement for purposes of attaching a component to a base item, with at least one fixing device for purposes of fixing the location of one section of the component on a section of the base item, and with at least one connecting device with a connecting element and with at least one receiving element, of which the one element can be arranged on a component section and the other element can be arranged on a base item section, and which detachably engage with one another in a form fit, wherein loads can be transferred at least in the direction of a first axis, and a relative movement is possible between the elements in the direction of a second axis; also disclosed is a connecting device for such an attachment arrangement, and also a method for purposes of attaching a component to a base item by means of such an attachment arrangement.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

2 Component
4 Base item
6 Attachment arrangement
8 Connecting device
10 Connecting element
12 Receiving element
14 Collar
16 Threaded section
18 Shank
20 Head section
22 Contact surface
24 Contact surface
26 Seating surface
28 Seating surface
30 Collar surface
32 Annular surface
34 End face groove
36 Nut
38 Hole
40 Washer
42 Base
44 Elongated hole 48 Collar section
50 Base item surface
52 Rivet hole
54 Region of Introduction
55 Hole wall
56 Spring tongue
58 Spring tongue
60 Latching tab
62 Latching tab
64 Latching groove
66 Latching groove
68 Groove wall
70 Groove wall
h Aircraft primary axis
n Aircraft secondary axis
b Aircraft movement axis
x Aircraft longitudinal direction
y Aircraft transverse direction
z Aircraft vertical direction

The invention claimed is:

1. An attachment arrangement for purposes of attaching a component to a base item, comprising:
    at least one fixing device for purposes of fixing a location of one section of the component on a section of the base item,
    at least one connecting device with a connecting element,
    at least one receiving element,
    wherein one of the connecting element and receiving element is arranged on a component section and the other of the connecting element and receiving element is arranged on a base item section,
    wherein, in an installed state the connecting element and the receiving element detachably engage with one another in a form fit,
    wherein the connecting element and the receiving element are pre-installed,
    wherein loads can be transferred at least in a direction of a primary axis, and relative movements are possible between the elements in a direction of a movement axis, different from the primary axis, and
    wherein the at least one fixing device operates as a fixed bearing and the at least one connecting device operates as a floating bearing with at least one degree of freedom.

2. The attachment arrangement in accordance with claim 1, wherein relative movements are possible between the elements in a direction of a secondary axis, different from either the primary axis and the movement axis.

3. The attachment arrangement in accordance with claim 1, wherein loads can be transferred in a direction of a secondary axis, different from either the primary axis and the movement axis.

4. The attachment arrangement in accordance with claim 1, wherein the connecting element and the receiving element form a latching action in the direction of the movement axis, which automatically opens when subjected to a set opening force.

5. The attachment arrangement in accordance with claim 4, wherein the connecting device has at least one spring tongue with a latching section and a latching section receptor.

6. The attachment arrangement in accordance with claim 1, wherein the connecting element has a shank that is tapered relative to a head section, which in the installed state extends in a direction of a secondary axis, and the receiving element has an elongated hole that receives the shank, which elongated hole in the installed state extends in the direction of the movement axis.

7. The attachment arrangement in accordance with claim 6, wherein the shank has opposed flattened contact surfaces and the elongated hole has two facing seating surfaces for purposes of providing seating for the contact surfaces.

8. The attachment arrangement in accordance with claim 6, wherein the head section tapers conically in a direction of introduction.

9. The attachment arrangement in accordance with claim 6, wherein a receptor is designed in the head section for purposes of interaction with an anti-rotation element.

10. The attachment arrangement in accordance with claim 1, wherein the connecting element can be connected with the component or with the base item by means of a screwed connection.

11. The attachment arrangement in accordance with claim 1, wherein the receiving element can be embodied integrally with the component or with the base item.

12. The attachment arrangement in accordance with claim 1, wherein the fixing device is a connecting device which transfers loads in the directions of all axes.

13. A connecting device for an attachment arrangement that includes at least one fixing device for purposes of fixing a location of one section of a component on a section of a base item, the connecting device comprising a connecting element and a receiving element, of which one of the connecting element and the receiving element is arranged on a component section and the other of the connecting element and the receiving element is arranged on a base item section, and which in an installed state detachably engage with one another in a form fit, wherein the connecting element and the receiving element are pre-installed, wherein loads are transferred at least in a direction of a primary axis, and relative movements are possible between the elements in a direction of a movement axis different from the primary axis, and wherein the at least one fixing device operates as a fixed bearing and the at least one connecting device operates as a floating bearing with at least one degree of freedom.

* * * * *